United States Patent [19]

Barley

[11] Patent Number: 4,505,513
[45] Date of Patent: Mar. 19, 1985

[54] SUSPENSION SEATS FOR VEHICLES
[75] Inventor: Geoffrey W. Barley, Brookfield, Wis.
[73] Assignee: UOP Inc., Des Plaines, Ill.
[21] Appl. No.: 524,166
[22] Filed: Jan. 7, 1983

Related U.S. Application Data

[63] Continuation of Ser. No. 129,506, Mar. 11, 1980.

[51] Int. Cl.³ .............................. A47C 3/00; B60N 1/02
[52] U.S. Cl. ..................................... 297/307; 297/323; 297/421
[58] Field of Search ............... 297/411, 421, 307, 308, 297/309, 323; 248/567

[56] References Cited

U.S. PATENT DOCUMENTS

| | | | |
|---|---|---|---|
| 2,838,095 | 6/1958 | Deaton | 297/421 |
| 3,879,007 | 4/1975 | Barton et al. | 248/567 |
| 4,200,166 | 4/1980 | Hansen | 297/411 |

Primary Examiner—Francis K. Zugel
Attorney, Agent, or Firm—James R. Hoatson, Jr.; Barry L. Clark; William H. Page, II

[57] ABSTRACT

The invention relates to a suspension seat for a vehicle. The vehicle suspension seat has a back rest guided for vertical movement relative to a base part, a seat rest hinged to the back rest and guided for movement such that the body of the seat occupant swings about an axis through his ankles. An armrest is mounted for movement relative to the back rest and seat rest, so as to minimize movement of the seat occupant's arm relative to a steering wheel, by pivotally supporting the armrest about the instantaneous centers of rotation of the armrest relative to two parts of the seat which move pivotally with respect to each other in response to vertical movement of the back rest.

3 Claims, 1 Drawing Figure

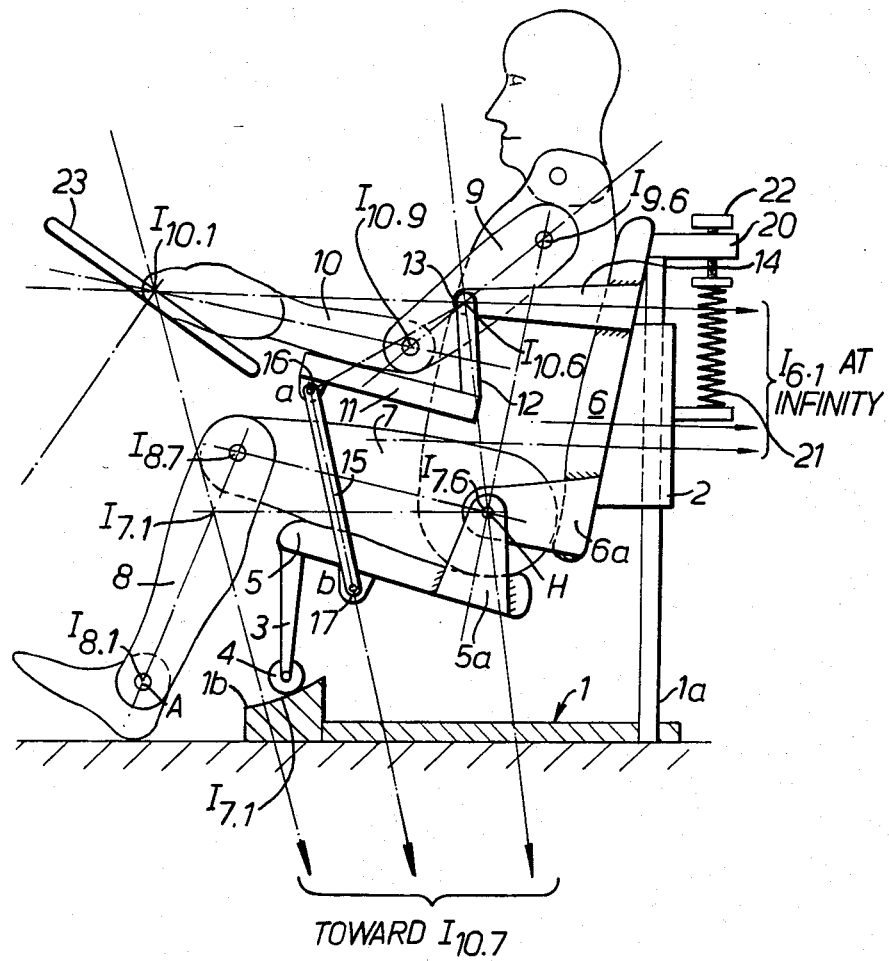

SUSPENSION SEATS FOR VEHICLES

BACKGROUND OF THE INVENTION

This invention relates to a suspension seat for a vehicle, and more particularly to a suspension seat having armrests for the arms of a coat occupant.

The main characteristic of a suspension seat is that it comprises a seat part (including a seat rest and a back rest) which is mounted on a spring suspension for upward and downward resilient movement relative to a base part of the seat, the latter being fixed to the floor of the vehicle cab. Consequently, when such a seat is occupied by the driver of the vehicle, his arms will rock as his body is raised or lowered relatively to the steering wheel or other hand controls of the vehicle. If armrests are provided, these should move in such a way that support is given to the driver's arms without detracting from his control of the vehicle. If such armrests are merely fixed to the seat rest or back rest, the required support will not be achieved.

BRIEF SUMMARY OF THE INVENTION

According to the present invention there is provided a vehicle seat comprising a seat part which includes a back rest and means pivotally connecting the seat rest to the back rest, a base part, and a suspension guiding the back rest for substantially vertical upward and downward movement, the suspension being operable to guide the seat rest for movement relatively to the back rest and the base part such that the body of the seat occupant swings about a horizontal axis through his ankles, the suspension comprising a spring for counter-balancing the seat part and seat occupant and an armrest on at least one side of the seat, and means mounting the armrest on the seat part and locating it to support the lower arm of a vehicle driver when the driver's hand is grasping a steering wheel or other control, the mounting means constraining the armrest to move about horizontal transverse axes through at least two instantaneous centers of rotation of the armrest about parts of the seat which move pivotally with respect to each other during said upward and downward movement.

Such instantaneous centers are determined from the knowledge that the driver's lower arm must be rotated about its point of connection with the hand control, and therefore the armrest must be rotated about this point.

The invention will now be described, by way of example, with reference to the accompanying drawing in which the single FIGURE shows diagrammatically a side view of a vehicle seat in accordance with the invention, with particular reference to the mounting of the armrest and movement of the armrest relative to other parts of the seat. The other side of the seat corresponds to that shown in the drawing, although the armrest and its supporting structure can be omitted on one side of the seat.

The details of the construction of the seat, apart from the means for supporting the armrest, form no part of the present invention, but it is to be assumed that the seat is a suspension seat, and constructed in accordance with the teaching of my copending U.S. Patent Application Ser. No. 39,636 filed May 16, 1979. In such seats, the seat rest is supported for movement relatively to the back rest in such a way that the horizontal transverse axis through the driver's ankles remains stationary relative to the base part, the driver's back being held at a substantially constant inclination to the vertical.

It is now necessary to consider the way in which a driver's arm will move in relation to the parts of the seat in order to achieve the objective of the invention. Use will be made in this connection of the Method of Instantaneous Centers of Rotation in considering the movement of the driver's arm relative to parts of the seat.

It should be borne in mind (1) That the Method of Instantaneous Centers of Rotation is based on the concept that any displacement of a body, movable in a plane, between two positions may be considered as a purely rotational movement about some center;

(2) That the center of rotation of a first link of a mechanism relative to a second link of the mechanism to which it is pivoted lies at the pivot;

(3) That the center of rotation of a body having linear movement lies at infinity on a line perpendicular to the direction of movement and (4) That if the instantaneous center of rotation of any part x relative to any part y is defined as the point $I_{xy}$ then if the mechanism has relatively moving parts a, b, c and d, the instantaneous center $I_{a.d.}$ is at the intersection of the line connecting $I_{a.b.}$ and $I_{b.d.}$ with the line connecting $I_{a.c.}$ and $I_{c.d.}$ If we now consider the parts of the seat shown in the drawing in relation to the anatomy of the driver, it will be seen that the seat comprises a base part 1 fixed to the floor of the vehicle and from which a column 1a extends upwardly, a frame 2 slidable on the column and supporting a back rest 6 for upward and downward movement at a fixed inclination to the vertical, and a seat rest 5 connected to the back rest 6 for upward and downward movement therewith by pivotally interconnected arms 5a, 6a rigidly connected to the seat rest 5 and back rest 6 respectively. The frame 2 is suspended from a bracket 20, at the top of column 1a, by a tension spring 21 whose tension is adjustable by a suitable screw mechanism 22.

Any suitable means can be provided for supporting the front part of the seat rest, but the support shown in the drawing (which is described in greater detail in my copending patent applications) comprises a vertical arm 3 rigidly connected to the seat rest 5 and carrying a roller 4 at its lower end. The roller 4 rests on an arcuate cam surface 1b such that seat rest 5, during rise and fall of the seat, will move in such a way that the driver's thigh will swing about the horizontal transverse axis through the point $I_{7.1}$ which is the instantaneous center of rotation of the driver's thigh relative to the base part 1.

The driver's anatomy comprises his thigh or upper leg 7 supported on the seat rest 5, his lower leg 8 supported on the base part 1 (or floor of the vehicle), his torso, above the hip H, which rests on the back rest 6 and is intended to move up and down therewith, his upper arm 9 and lower arm 10 including the hand.

If the lower arm 10 is to be supported so that the driver's hand is stationary relative to the vehicle hand controls (shown in the drawing as a steering wheel 23) an armrest 11 must be provided which is so mounted as to afford such support. This can be achieved if the lower arm 10 (and thus in practice the armrest) is supported at two Instantaneous Centers of Rotation of the lower arm 10 relative to parts of the suspension seat (including the base part) which move relatively to one another.

The Instantaneous Center of Rotation have been indicated in the drawing for various parts of the system but the only instantaneous centers of rotation of the lower arm 10 relative to illustrated parts of the seat are $I_{10.1}$, $I_{10.6}$ and $I_{10.7}$. ($I_{10.7}$ being equivalent to $I_{10.5}$ if one considers that thigh 7 and seat rest 5 move together).

If however the drawing illustrated a different type of suspension, (of which many are described in my co-pending patent applications mentioned above) the instantaneous centers of rotation of the lower arm 10 relative to the parts of such suspensions could be illustrated, and each different pair of such centers would provide a pair of pivot points at which the armrest could be supported to achieve the objectives of the invention.

The rearward end of the armrest 11 has an upstanding extension 12 which is provided with a pivotal connection 13 at $I_{10.6}$ to an arm 14 mounted rigidly on the back rest 6 and extending forward to the pivot connection 13. The forward end of the armrest 11 is connected to the seat rest 5 by a link 15 having pivotal connections 16, 17 at its opposite ends to the armrest 11 and to the seat rest 5. This is a practical way of ensuring that the instantaneous direction of motion of point 16 is the same as if point 16 were caused to rotate about $I_{10.7}$.

It will be seen that the point $I_{10.6}$ falls approximately midway between the opposite ends $I_{10.9}$ and $I_{9.6}$ of the seat occupant's upper arm 9.

Although only one way has been described of supporting armrest 11 for movement to maintain the driver's hand substantially at rest during upward and downward movement of the seat, the teaching given above will enable those skilled in the art to readily devise corresponding armrest supporting means to suit the details of the seat suspension being employed.

In one modification of the illustrated embodiment, link 15 is omitted, and in substitution, arm 5a is extended upwardly and to the left to reach point 16 where it is formed with a slot arcuate about point $I_{10.7}$ and of a radius equal to the distance between point 16 and point $I_{10.7}$, and a slider pivoted to the armrest 11 at point 16 slidably engages in this slot. In this way, the front end of the armrest is accurately supported for movement about the point $I_{10.7}$.

I claim:

1. A vehicle seat adapted to receive an occupant of a predetermined size comprising a seat part, which includes a back rest, a seat rest, means for mounting the seat rest for tilting movement relative to the back rest, a base part, and a suspension means mounting and guiding the back rest for substantially vertical upward and downward movement relative to the base part in a ride zone extending above and below a mid-ride position of the seat rest, the suspension means and the means for mounting the seat rest being operable together to guide the seat rest in said tilting movement relative to the back rest such that at the mid-ride position of the seat there is no relative movement, as the seat rest moves above and below its mid-ride position, between the thighs of an occupant for whom the seat is designed and the seat rest, nor between the back of an occupant and the back rest and such that the occupant's ankles remain fixed at a predetermined point relative to the base part, the suspension means comprising a spring for counterbalancing the seat part and seat occupant; an armrest on at least one side of the seat, and means mounting fore and aft portions of the armrest for tilting movement relative to the seat rest and the back rest and locating the armrest so as to support, without relative movement, the lower arm of the occupant when the occupant is the vehicle driver so that the driver's hand will remain fixed at a predetermined point relative to the base part when the driver is grasping a steering wheel or other control, said last named mounting means constraining the said fore and aft portions of the armrest to pivotally move about a pair of horizontal transverse axes, one of said pair of axes being the instantaneous center of rotation of the occupant's lower arm and the armrest about a first part of the seat which moves pivotally with respect to the armrest during said upward and downward movement, the other of said pair of axes being located in such a manner that its intantaneous direction of motion is the same as if the said transverse axis moves in an arc about the instantaneous center of rotation of the driver's lower arm and the armrest relative to a second part of the seat which moves pivotally with respect to the armrest during said upward and downward movement.

2. A vehicle seat adapted to receive an occupant of a predetermined size comprising a seat part, which includes a seat rest, a back rest, and means mounting the seat rest for tilting movement relative to a back rest, a base part, a suspension guiding the back rest for substantially vertical upward or downward movement relative to the base part in a ride zone extending above and below a mid-ride position of the seat rest, the suspension including means guiding the seat rest for tilting movement relative to the back rest and to the base part such that the ankles of a seat occupant for whom the seat is designed will remain fixed relative to the base part as the suspension moves above and below its mid-ride position, a spring for counterbalancing the seat part and the seat occupant, an armrest on at least one side of the seat, and means mounting the armrest for movement relative to the seat rest and back rest so that the armrest will support the lower arm of the occupant, without relative movement, when the occupant is the vehicle driver and the driver's hand is grasping the vehicle's steering wheel or other control which is fixedly mounted relative to the base part, said mounting means comprising a link having a first pivotal connection at its upper end to the forward end of the armrest, and a second pivotal connection at its opposite end to a point on the seat part adjacent to or below the thigh of the seat occupant, said mounting means further comprising a member supported by the back rest, the armrest having a second pivotal connection above its rearward end to said member at a point intermediate the length of the upper arm of the seat occupant.

3. A vehicle seat according to claim 1 wherein said other (16) of said pair of transverse axes moves in an arc about the instantaneous center of rotation ($I._{10.7}$) of the occupant's lower arm (10) relative to said second part (5, is extension of thigh 7) of the seat which moves pivotally with respect to the armrest during said upward and-downward movement.

* * * * *